United States Patent
Ouyang et al.

(10) Patent No.: US 10,254,967 B2
(45) Date of Patent: Apr. 9, 2019

(54) DATA PATH CONTROL FOR NON-VOLATILE MEMORY

(71) Applicant: SanDisk Technologies LLC, Plano, TX (US)

(72) Inventors: Jingwen Ouyang, Mountain View, CA (US); Tz-Yi Liu, Palo Alto, CA (US); Henry Zhang, Saratoga, CA (US); Yingchang Chen, Cupertino, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 15 days.

(21) Appl. No.: 15/402,180

(22) Filed: Jan. 9, 2017

(65) Prior Publication Data

US 2017/0199668 A1      Jul. 13, 2017

Related U.S. Application Data

(60) Provisional application No. 62/278,227, filed on Jan. 13, 2016.

(51) Int. Cl.
*G11C 16/34* (2006.01)
*G11C 16/10* (2006.01)
*G06F 3/06* (2006.01)

(52) U.S. Cl.
CPC ............ *G06F 3/061* (2013.01); *G06F 3/0655* (2013.01); *G06F 3/0679* (2013.01); *G06F 3/0688* (2013.01)

(58) Field of Classification Search
CPC ...... G06F 3/0659; G06F 3/061; G06F 3/0688; G06F 3/0655; G11C 7/10; G11C 16/0483; G11C 16/10; G11C 16/3427; G11C 16/3436

See application file for complete search history.

(56) References Cited

U.S. PATENT DOCUMENTS

| | | | |
|---|---|---|---|
| 5,022,004 A | 6/1991 | Kurtze et al. | |
| 5,548,795 A | 8/1996 | Au | |
| 5,664,114 A | 9/1997 | Krech, Jr. et al. | |
| 5,951,635 A | 9/1999 | Kamgar | |
| 6,091,663 A | 7/2000 | Kim et al. | |
| 6,166,564 A | 12/2000 | Rosen | |
| 6,216,178 B1 | 4/2001 | Stracovsky et al. | |
| 6,263,410 B1 | 7/2001 | Kao et al. | |
| 6,385,129 B1 | 5/2002 | Silvestri | |

(Continued)

OTHER PUBLICATIONS

JEDEC Standard, Low Power Double Data Rate 3 (LPDDR3), JESD209-3, May 2012, Arlington, VA.

(Continued)

*Primary Examiner* — Hien Nguyen
(74) *Attorney, Agent, or Firm* — Kunzler, PC

(57) ABSTRACT

Apparatuses, systems, and methods are disclosed for controlling a data path for non-volatile memory. An apparatus includes one or more memory die. A memory die includes a memory core. A memory core includes an array of non-volatile memory cells and an internal data pipeline. A memory die includes a buffer that stores data associated with storage operations for a memory core. A memory die includes an internal controller that communicates with a memory core to initiate storage operations. An internal controller may delay initiating a storage operation in response to determining that an internal data pipeline and a buffer are both full.

20 Claims, 6 Drawing Sheets

(56) References Cited

U.S. PATENT DOCUMENTS

| | | |
|---|---|---|
| 6,393,512 B1 | 5/2002 | Chen et al. |
| 6,393,534 B1 | 5/2002 | Chen et al. |
| 6,504,768 B1 | 1/2003 | Roohparvar et al. |
| 6,567,321 B2 | 5/2003 | Lee |
| 6,614,798 B1 | 9/2003 | Bishop et al. |
| 6,628,563 B1 | 9/2003 | Hsu et al. |
| 6,778,445 B2 | 8/2004 | Ooishi et al. |
| 6,912,598 B1 | 6/2005 | Bedarida et al. |
| 7,038,952 B1 | 5/2006 | Zack et al. |
| 7,038,953 B2 | 5/2006 | Aoki |
| 7,184,508 B2 | 2/2007 | Emberling |
| 7,254,688 B2 | 8/2007 | Uneme |
| 7,277,982 B2 | 10/2007 | Calvignac et al. |
| 7,310,396 B1 | 12/2007 | Sabih |
| 7,499,364 B2 | 3/2009 | Ahn et al. |
| 7,562,193 B2 | 7/2009 | Floman et al. |
| 7,831,801 B1 | 11/2010 | Anderson |
| 7,889,580 B2 | 2/2011 | Millar et al. |
| 7,970,977 B1 | 6/2011 | Li et al. |
| 8,041,885 B2 | 10/2011 | Jo et al. |
| 8,327,057 B1 | 12/2012 | Venkatramani |
| 8,612,651 B2 | 12/2013 | Boonstra et al. |
| 8,656,093 B1 | 2/2014 | Edmondson et al. |
| 8,832,324 B1 | 9/2014 | Hodges et al. |
| 8,914,589 B2 | 12/2014 | Gregorius et al. |
| 9,087,568 B1 | 7/2015 | Ware |
| 9,285,824 B2 | 3/2016 | Zhu et al. |
| 9,851,905 B1 | 12/2017 | Ramalingam et al. |
| 9,858,976 B2 | 1/2018 | Ikegami et al. |
| 10,114,586 B1* | 10/2018 | Benisty ................ G06F 3/0656 |
| 2001/0036105 A1 | 11/2001 | Takata |
| 2002/0159294 A1 | 10/2002 | Kato |
| 2003/0120861 A1 | 6/2003 | Calle et al. |
| 2004/0027856 A1 | 2/2004 | Lee et al. |
| 2004/0027857 A1 | 2/2004 | Ooishi |
| 2004/0057282 A1 | 3/2004 | Cernea |
| 2004/0057283 A1 | 3/2004 | Cernea |
| 2004/0060031 A1 | 3/2004 | Cernea |
| 2004/0156235 A1 | 8/2004 | Bellini et al. |
| 2005/0071547 A1 | 3/2005 | Lin |
| 2005/0114556 A1 | 5/2005 | Solomon |
| 2005/0273543 A1 | 12/2005 | Middleton et al. |
| 2006/0140007 A1 | 6/2006 | Cernea et al. |
| 2008/0094871 A1 | 4/2008 | Parkinson |
| 2008/0109627 A1 | 5/2008 | Toyama et al. |
| 2008/0151648 A1 | 6/2008 | Eilert et al. |
| 2008/0225625 A1 | 9/2008 | Parkinson et al. |
| 2009/0157985 A1 | 6/2009 | Stevens et al. |
| 2009/0240873 A1* | 9/2009 | Yu ...................... G06F 3/0608 711/103 |
| 2010/0100668 A1 | 4/2010 | Huang |
| 2010/0100669 A1 | 4/2010 | Huang |
| 2010/0103723 A1 | 4/2010 | Kawai et al. |
| 2010/0185703 A1 | 7/2010 | Yionen |
| 2011/0041039 A1 | 2/2011 | Harari et al. |
| 2011/0051518 A1 | 3/2011 | Fujimura |
| 2011/0051519 A1 | 3/2011 | Lee et al. |
| 2011/0060875 A1 | 3/2011 | Haukness et al. |
| 2011/0069526 A1 | 3/2011 | Schuette |
| 2011/0072200 A1 | 3/2011 | Lee et al. |
| 2011/0072201 A1 | 3/2011 | Lee et al. |
| 2011/0119425 A1 | 5/2011 | Kollipara et al. |
| 2011/0208905 A1 | 8/2011 | Shaeffer et al. |
| 2012/0033496 A1* | 2/2012 | Yano ................ G06F 12/0246 365/185.08 |
| 2012/0066439 A1* | 3/2012 | Fillingim ............ G06F 11/3485 711/103 |
| 2012/0210041 A1 | 8/2012 | Flynn et al. |
| 2012/0213012 A1 | 8/2012 | Johnson et al. |
| 2012/0250411 A1 | 10/2012 | Abiko et al. |
| 2012/0260032 A1 | 10/2012 | Chiu et al. |
| 2013/0054885 A1 | 2/2013 | Choi |
| 2013/0188482 A1 | 7/2013 | Lee |
| 2013/0232296 A1* | 9/2013 | Yonezawa .......... G06F 12/0246 711/103 |
| 2013/0246716 A1* | 9/2013 | Kato .................... G06F 3/064 711/148 |
| 2014/0019672 A1 | 1/2014 | Harasawa et al. |
| 2014/0075233 A1 | 3/2014 | Bartling et al. |
| 2014/0250260 A1 | 9/2014 | Yap |
| 2016/0092223 A1* | 3/2016 | Wang .................. G06F 9/3004 712/208 |
| 2016/0124639 A1 | 5/2016 | Hyun et al. |
| 2017/0262192 A1 | 9/2017 | Aga et al. |
| 2018/0024948 A1* | 1/2018 | Tsai ................... G11C 16/3454 710/310 |
| 2018/0067648 A1* | 3/2018 | Lin ....................... G06F 3/061 |
| 2018/0136843 A1 | 5/2018 | Lee et al. |
| 2018/0136851 A1 | 5/2018 | Batra et al. |
| 2018/0136877 A1* | 5/2018 | Ouyang ............... G06F 3/0659 |
| 2018/0136878 A1 | 5/2018 | Madpur et al. |
| 2018/0260347 A1* | 9/2018 | Benisty ................. G06F 13/28 |

OTHER PUBLICATIONS

PCT International Patent Application No. PCT/US2017/049744 International Search Report and Written Opinion dated Dec. 13, 2017.
U.S. Appl. No. 15/408,318 Non-Final Rejection dated Feb. 15, 2018.
U.S. Appl. No. 15/408,318 Notice of Allowance dated Jul. 11, 2018.
U.S. Appl. No. 15/671,128 Office Action dated Nov. 29, 2018.
U.S. Appl. No. 15/365,944 Office Action dated Dec. 6, 2018.

* cited by examiner

US 10,254,967 B2

DATA PATH CONTROL FOR NON-VOLATILE MEMORY

CROSS-REFERENCES TO RELATED APPLICATIONS

This application claims the benefit of U.S. Provisional Patent Application No. 62/278,227 entitled "DATA-PATH CONTROL WITH INTERNAL CLOCK AND ASYNCHRONOUS FIFO" and filed on Jan. 13, 2016 for Jingwen Ouyang et al., which is incorporated herein by reference.

TECHNICAL FIELD

The present disclosure, in various embodiments, relates to non-volatile memory and more particularly relates to controlling a data path for non-volatile memory.

BACKGROUND

The amount of time it takes for a non-volatile memory element to service or perform a storage operation may include time spent actually sensing or changing physical properties of non-volatile storage cells to read or write the data, time spent transferring the data on a data bus, and additional latency in the data path for moving address information and/or data internally within the non-volatile memory element, for filling a buffer for the storage operation (e.g., by pre-fetching read data), or the like. As speeds increase for non-volatile media and for data buses, less time is spent actually reading or writing and transferring the data, and the data path latency becomes more significant. Additionally, the significance of data path latency is further increased as access is provided to data in smaller units (e.g., in a manner more like a fast byte-addressable volatile memory and less like a slow, sector-addressable hard drive). For example, a latency period that may be reasonable for an operation that provides access to a large block of data may be far too long for an operation that provides access to a few bytes of data in a small burst.

SUMMARY

Apparatuses are presented for controlling a data path for non-volatile memory. In one embodiment, an apparatus includes one or more memory die. In a certain embodiment, a memory die includes a memory core. In a further embodiment, a memory core includes an array of non-volatile memory cells and an internal data pipeline. In one embodiment, a memory die includes a buffer that stores data associated with storage operations for a memory core. In a certain embodiment, a memory die includes an internal controller that communicates with a memory core to initiate storage operations. In a further embodiment, an internal controller delays initiating a storage operation in response to determining that an internal data pipeline and a buffer are both full.

An apparatus, in another embodiment, includes means for buffering data associated with storage operations for a memory core. In a certain embodiment, a memory core includes an array of non-volatile memory cells and an internal data pipeline. In a further embodiment, an apparatus includes means for dispatching addresses for executing storage operations. In one embodiment, an apparatus includes means for halting dispatch of an address for a storage operation in response to determining that a difference between a number of addresses that have been dispatched and a number of storage operations that have been completed satisfies a threshold. In a further embodiment, a threshold may be based on a total number of stages in an internal data pipeline and in a means for buffering data.

Methods are presented for controlling a data path for non-volatile memory. In one embodiment, a method includes storing data in a queue. In a certain embodiment, data is associated with storage operations for a memory core. In a further embodiment, a memory core includes an array of non-volatile storage cells and an internal data pipeline. In certain embodiments, a method includes determining whether a queue and an internal data pipeline, combined, include an empty stage. In further embodiments, a method includes starting a storage operation in response to determining that a queue and an internal data pipeline, combined, include an empty stage.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1:
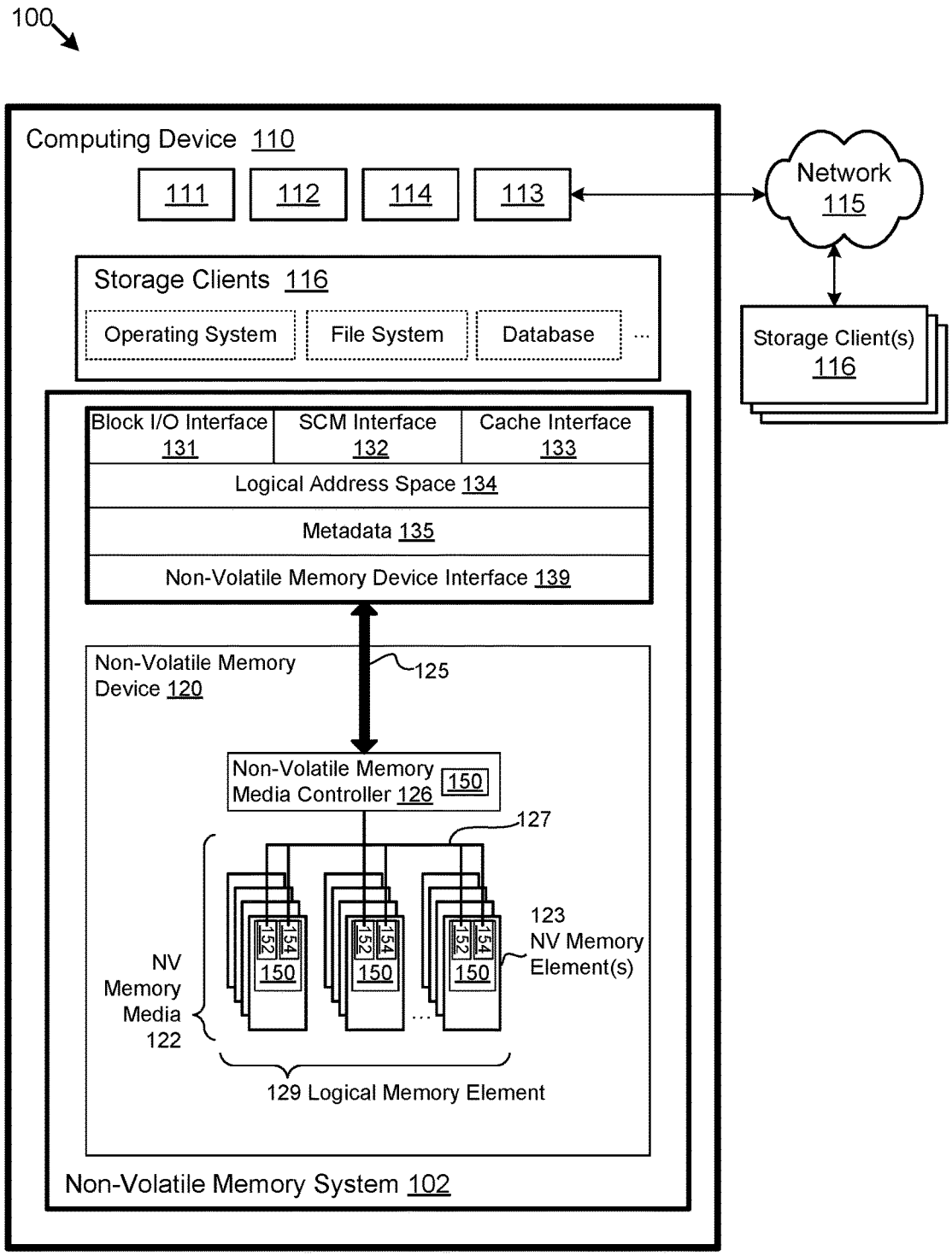
FIG. 1 is a schematic block diagram illustrating one embodiment of a system comprising a data path control component.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, resistive (e.g., resistive random access memory (ReRAM), memory resistor (Memristor) memory, programmable metallization cell memory, phase-change memory (PCM, PCME, PRAM, PCRAM, ovonic unified memory, chalcogenide RAM, or C-RAM), or the like), or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures like numbers may refer to like elements in the figures, including alternate embodiments of like elements.

FIG. 1 is a block diagram of one embodiment of a system 100 comprising a data path control component 150 for a non-volatile memory device 120. The data path control component 150 may be part of and/or in communication with a non-volatile memory media controller 126, a non-volatile memory element 123, a device driver, or the like. The data path control component 150 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or non-volatile memory controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein. Alternatively, or in addition, one or more portions of the data path control component 150 may be embodied as one or more computer readable instructions stored on the non-transitory storage medium 114.

In one embodiment, the one or more non-volatile memory elements 123 may be configured to transmit and receive data for data operations for the non-volatile memory device 120. For example, a non-volatile memory element 123 may comprise a first port, bus or path 152 for communicating command and address information for storage operations, and a second port, bus, or path 154 for transferring data for storage operations. A non-volatile memory element 123 may support multiple access modes, such as a first mode (e.g., a burst mode) which may provide a full speed and/or access to one or more unique features of the non-volatile memory media 122, a second mode (e.g., a legacy mode or compatibility mode) which may provide support for a different access protocol (e.g., an older access protocol, emulating a different type of memory media 122 such as NAND flash, or the like. For example, in one embodiment, the non-volatile memory media 122 may comprise a resistive memory medium such as ReRAM, Memristor memory, programmable metallization cell memory, phase-change memory (PCM, PCME, PRAM, PCRAM, ovonic unified memory, chalcogenide RAM, or C-RAM), or the like and a non-volatile memory element 123 may provide two access modes, one mode comprising a legacy or compatibility mode which emulates a NAND flash access protocol (e.g., a NAND flash toggle mode), or the like, for clients 116 configured to use a legacy access protocol.

In a first mode (e.g., a burst mode, a native mode, or the like) the first port 152 may receive command and/or address information for data operations on the non-volatile memory device 120 and/or element 123, while the second port 154 transmits data of the data operations (e.g., receiving data from a client 116 for a write request, sending data to a client 116 for a read request, or the like). In a second mode (e.g., a legacy mode, a compatibility mode, or the like) the first port 152 may both receive command and address information for data operations and transmit data for the operations (e.g., so that the second port 154 isn't used in the second mode).

The non-volatile memory system 102, in the depicted embodiment, includes a data path control component 150. The data path control component 150, in one embodiment, includes a buffer that stores data associated with storage operations for a memory core, where the memory core includes an array of non-volatile memory cells and an internal data pipeline. In a further embodiment, the data path control component 150 includes an internal controller that communicates with the memory core to initiate the storage operations. The internal controller may delay initiating a storage operation in response to determining that the internal data pipeline and the buffer are both full. In general, in various embodiments, delaying initiation of a storage operation if a buffer is too full for the data of the storage operation may prevent problems associated with buffer overflows, such as data corruption. In further embodiments, delaying initiating a storage operation if the buffer and the internal pipeline are both full allows the internal pipeline to function as an extension of the buffer. Using the internal pipeline as an extension of the buffer may make overflows less likely by providing additional space to buffer data, while avoiding latency and on-die area increases that would be associated with adding stages to the buffer.

In one embodiment, the data path control component 150 may comprise logic hardware of one or more non-volatile memory devices 120, such as a non-volatile memory media controller 126, a non-volatile memory element 123, a device controller, a field-programmable gate array (FPGA) or other programmable logic, firmware for an FPGA or other programmable logic, microcode for execution on a microcontroller, an application-specific integrated circuit (ASIC), or the like. In another embodiment, the data path control component 150 may comprise executable software code, such as a device driver or the like, stored on the computer readable storage medium 114 for execution on the processor 111. In a further embodiment, the data path control component 150 may include a combination of both executable software code and logic hardware.

In one embodiment, a non-volatile memory element 123 is configured to receive storage requests from a device driver or other executable application via a bus 125 or the like. A non-volatile memory element 123 may be further configured to transfer data to/from a device driver and/or storage clients 116 via the bus 125. Accordingly, a non-volatile memory element 123, in some embodiments, may comprise and/or be in communication with one or more direct memory access (DMA) modules, remote DMA modules, bus controllers, bridges, buffers, and so on to facilitate the transfer of storage requests and associated data. In another embodiment, a non-volatile memory element 123 may receive storage requests as an API call from a storage client 116, as an IO-CTL command, or the like.

According to various embodiments, a non-volatile memory controller 126 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the non-volatile memory media controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective non-volatile memory media controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more non-volatile memory media controllers 126.

A device driver may present a logical address space 134 to the storage clients 116 through one or more interfaces. As discussed above, the logical address space 134 may comprise a plurality of logical addresses, each corresponding to respective media locations the on one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the non-volatile memory controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The non-volatile memory controller 126 is part of and/or in communication with one or more non-volatile memory devices 120. Although FIG. 1 depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, or the like. A non-volatile memory media controller 126 may be configured to manage data operations on the non-volatile memory media 122, and may comprise one or more processors, programmable processors (e.g., FPGAs), ASICs, micro-controllers, or the like. In some embodiments, the non-volatile memory media controller 126 is configured to store data on and/or read data from the non-volatile memory media 122, to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The non-volatile memory controller 126 may comprise and/or be in communication with a device driver executing on the computing device 110. A device driver may provide storage services to the storage clients 116 via one or more interfaces 131, 132, and/or 133. In some embodiments, a device driver provides a block-device 110 interface 131 through which storage clients 116 perform block-level I/O operations. Alternatively, or in addition, a device driver may provide a storage class memory (SCM) interface 132, which may provide other storage services to the storage clients 116.

In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102.

A device driver may further comprise a non-volatile memory device interface 139 that is configured to transfer data, commands, and/or queries to the non-volatile memory media controller 126 over a bus 125, as described above.

Figure 2:
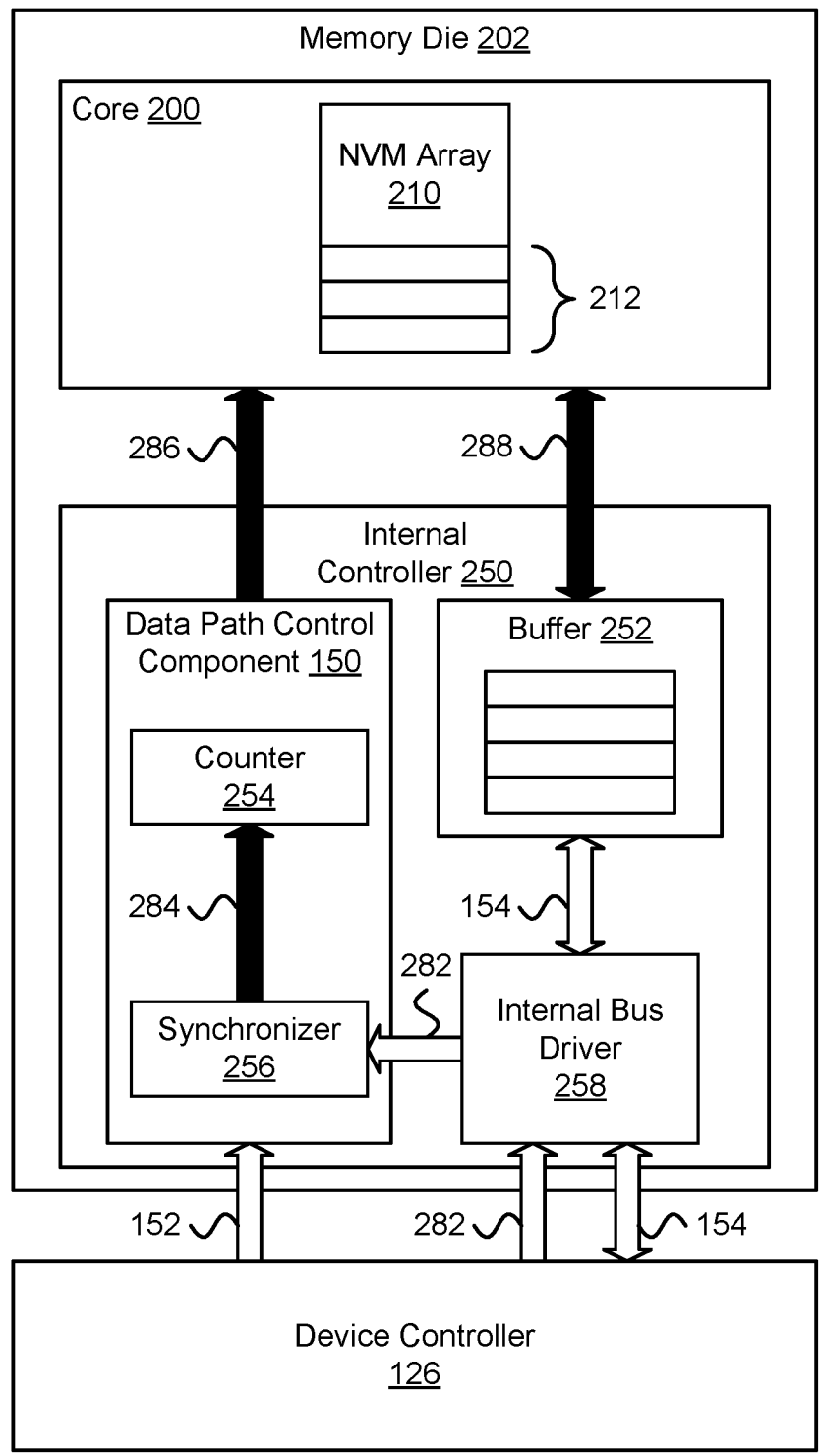
FIG. 2 is a schematic block diagram illustrating one embodiment of a non-volatile memory die in communication with a device controller.

FIG. 2 depicts one embodiment of a non-volatile memory die 202 in communication with a device controller 126. The device controller 126 may be substantially similar to the non-volatile memory media controller 126 described above with regard to FIG. 1. In one embodiment, the device controller 126 may include a hardware controller for a storage device including the non-volatile memory elements 123. In another embodiment, the device controller 126 may include a device driver for a storage device including the non-volatile memory elements 123, and the device driver may include logic hardware and/or executable code stored on one or more computer readable storage media. The non-volatile memory die 202 may be substantially similar to a non-volatile memory element 123 described above with regard to FIG. 1. A die 202, in various embodiments, may refer to an integrated circuit that includes at least one core 200. In one embodiment, such an integrated circuit may be a three-dimensional integrated circuit that includes multiple die planes and/or layers, but may still be referred to as a die 202. Although a single non-volatile memory die 202 is depicted in FIG. 2, a device controller 126 may be coupled to or in communication with multiple non-volatile memory die 202 in non-volatile memory elements 123 for a non-volatile memory device 120.

In the depicted embodiment, the device controller 126 is coupled to the die 202 via a first port, bus, or path 152 for command and address information, and a second port, bus, or path 154 for transferring data, which may be substantially similar to the ports, buses, or paths 152, 154 described above with regard to FIG. 1. In the depicted embodiment, the die 202 includes a core 200, and an internal controller 250. In the depicted embodiment, the internal controller 250 includes a data path control component 150, a buffer 252, and an internal bus driver 258. The internal controller 250, in various embodiments, may be a controller internal to the memory die 202 (e.g., an on-die controller, as distinct from the device controller 126, which is external to the memory die 202). The device controller 126 may select a die 202 (such as the depicted die 202 or another die 202) as a target for a storage operation, and may communicate with the internal controller 250 for the selected die 202 to send command and address information and to transfer (e.g., send or receive) data for storage operations on the selected die 202.

In various embodiments, a core 200 includes an array 210 (two or three dimensional) of non-volatile memory cells, and an internal data pipeline 212. The internal controller 250 communicates with a core 200 to perform storage operations such as reading, writing, erasing, and the like using the array 210 of cells for the core 200. In certain embodiments, a "cell" may refer to a smallest or fundamental physical unit of memory, or storage, for a core 200, and may be referred to interchangeably as a "storage cell," a "memory cell" or the like. For example, a cell may be a floating gate transistor for NAND flash memory, a memristor for resistive memory, or the like. Thus, in a further embodiment, an array 210 of cells for a core 200 may be a two-dimensional grid, a three-dimensional block, a group, or other similar set of cells where data can be physically stored, for short-term memory use, long-term storage use, or the like. In certain embodiments, a core 200 may include further or peripheral components in addition to the array 210, such as word line drivers, sense amplifiers for bit lines, latches to store data that is being read from or written to the array 210, and the like.

The internal data pipeline 212, in various embodiments, may be a data pipeline internal to the core 200 (e.g., adjacent or in close proximity to rows or columns of the array 210). The internal data pipeline 212 may include storage circuits, elements, or components that temporarily store data being written to, or read from, the array 210. For example, in one embodiment, data may be written to or read from the array 210 on bit lines, and the bit lines may be connected to latches that store bits that will be written via the bit lines, or that receive bits that have been read via the bit lines. In a further embodiment, where each cell of the array 210 stores multiple bits (e.g., by dividing a range for a stored voltage, a stored resistance, or the like into four, eight, or another number of states), a bit line may be coupled to a plurality of latches for reading or writing multiple bits of data to cells in the array 210. In a legacy mode that provides block or page level access to the array 210 (e.g., in 512 B pages, 4 KiB pages, or the like), latches coupled to bit lines may store one or more pages of data, and may be referred to as a page register buffer. In a burst mode that provides byte-addressable access to the array 210 in bursts of 4 bytes, 8 bytes, or the like (e.g., at the width of a processor register, a memory bus, or the like), a page register buffer with space for a small number of pages may include space for temporarily storing or queuing a larger number of memory bursts. The internal data pipeline 212 may include latches of a page register buffer, a smaller number of latches (e.g., for a core 200 that does not provide a page- or block-addressable legacy mode), additional temporary storage circuits or components, or the like.

In certain embodiments, a "stage" of the internal data pipeline 212 (or of the buffer 252) may refer to a region, set, or grouping of latches, registers, or other storage circuits or elements capable of buffering data for one storage operation. For example, if a storage operation reads or writes a page of data, a stage is capable of storing one page. Thus, in further embodiments, the number of stages in the internal data pipeline 212 is effectively the number of storage operations that can be buffered by the internal data pipeline 212. In some embodiments that provide storage operations of different sizes (e.g., in a block-addressable legacy mode and a byte-addressable burst mode, the number of stages in the pipeline 212 may vary based on the size of the storage operations. For example, a data pipeline 212 that provides one stage for page-level operations may provide a plurality of stages for smaller data bursts. In the depicted embodiment, the internal data pipeline 212 includes three stages. However, the internal data pipeline 212 may provide a larger or smaller number of stages in another embodiment.

The buffer 252, in various embodiments, stores, buffers, or queues data associated with storage operations for the memory core 200. In certain embodiments, a storage operation may include a read operation, a write operation, a program operation, an erase operation, or the like. Data associated with a storage operation may include data to be written to the core 200, for a write operation, data to be read from the core 200, for a read operation, or the like. In certain embodiments, a buffer 252 may maintain a first-in-first-out (FIFO) order for the data, so that data for read operations is stored in the order in which the read operations were requested, data for write operations is stored in the order in which it was sent from the device controller 126, and the like, and the buffer 252 may be referred to as a FIFO or queue. In the depicted embodiment, the memory die 202 includes one buffer 252. In another embodiment, the memory die 202 may provide multiple buffers 252, such as a first buffer 252 for read operations, and a second buffer 252 for write operations.

In various embodiments, a buffer 252 may include a set of storage locations for data, such as registers, latches, a range of volatile memory, a circular buffer, a FIFO circuit, or the like. As with the internal data pipeline 212 for the core 200, a "stage" of the buffer 252 may refer to a region, set, grouping, or area of latches, registers, memory locations, or other storage circuits or elements for the buffer 252, capable of buffering data for one storage operation. In the depicted embodiment, the buffer 252 includes four stages, but a buffer 252 in another embodiment may include a larger or smaller number of stages.

The internal controller 250, in one embodiment, communicates via the command/address port 152 and the data port 154 to receive command and address information and to transfer data for storage operations on the core 200. In various embodiments, an internal controller 250 may refer to a component, control/operation logic, a set of components, or the like on a die 202, that receives command and/or address information, transfers data to or from a device controller 126, communicates commands, addresses, and/or data to one or more cores 200, or the like.

In the depicted embodiment, the internal controller 250 receives command and address information for storage operations via the command/address port 152. In certain embodiments, command and address information may include commands, such as read commands, write commands, program commands, erase commands, status query commands, and any other commands supported by the core 200, and addresses corresponding to the commands, such as an address to write data to, an address to read data from, or the like. The internal controller 250 may receive command and address information from a device controller 126. For example, the device controller 126 may send command and address information using the command/address port 152.

In various embodiments, the internal controller 250 may decode or convert the command and address information from the device controller 126 into a format used by the core 200. For example, in one embodiment, a command/address decoder for the internal controller 250 may provide an address interface to convert between the address that is used by the host or a device controller 126 to the hardware address used by the core 200. In a certain embodiment, the internal controller 250 may buffer or queue command and address information, to match the command and address information for a storage operation to the associated data in the buffer 252. In certain embodiments, the internal controller 250 may use the data path control component 150 to receive command and address information for storage operations from the device controller 126, and to dispatch addresses to the core 200 to initiate the storage operations.

In one embodiment, the internal controller 250 uses an internal bus driver 258 to transfer data to or from the core 200 (via the buffer 252), and to transfer data to or from the device controller 126 using the data port 154. In certain embodiments, the internal bus driver 258 may serialize or deserialize data to convert between different internal or external data bus widths. In one embodiment, the internal bus driver 258 may include or coordinate with the buffer 252 to control data flow between the buffer 252 and the core 200 on an internal bus. In a further embodiment, the internal bus driver 258 may cooperate with the data path control component 150 to coordinate addresses and data for a storage operation.

The data path control component 150 may be substantially similar to the data path control component 150 described above with regard to FIG. 1. In various embodiments, the internal controller 250 uses the data path control component 150 to communicate with the memory core 200 to initiate storage operations. In certain embodiments, the data path control component 150 sends control information to the internal bus driver 258 to control data flow for storage operations, initiate commands or operation, dispatch addresses, or the like. In various embodiments, initiating an operation may refer to commencing, beginning, or starting an operation in any way. For example, in one embodiment, the internal controller 250 may initiate an operation by dispatching an address to the core 200 for executing the operation.

For an example of initiating and executing a read operation, in one embodiment, the data path control component 150 may receive command and address information via the command/address port 152. The data path control component 150 may initiate the read operation by sending (or by using the internal bus driver 258 to send) an address for the read operation to the core 200 via an internal address bus 286. The core 200 may perform the read operation by sensing or detecting data values stored in the cells of the array 210, and may output the data using the internal data pipeline 212. The core 200 may send the read data to the buffer 252 via an internal data bus 288. In FIG. 2, the internal address and data buses 286, 288 are depicted separately for convenience in visualizing the flow of addresses and data. In certain embodiments, however, the internal address bus 286 and the internal data bus 288 may be a single internal bus capable of transmitting addresses and data. The device controller 126 may retrieve the read data from the buffer 252 via the data port 154. In certain embodiments, the internal bus driver 258 may control data flow between the core 200 and the buffer 252 via the internal bus, and/or data flow between the buffer 252 and the device controller 126. In a further embodiment, the device controller 126 may provide an external clock signal 282 (e.g., generated by the device controller 126 or another clock signal generator external to the memory die 202) for controlling data flow via the data port 154.

For an example of initiating and executing a write operation, in one embodiment, the data path control component 150 may receive command and address information via the command/address port 152. The device controller 126 may send the data to be written to the buffer 252 via the data port 154. Data transfer from the device controller 126 to the buffer 252 may be controlled according to the external clock signal 282 provided by the device controller 126. The data path control component 150 may coordinate with the internal bus driver 258 to match the address to the data for the write operation, and to initiate the operation by sending the address and data to the core 200 via the internal address bus 286 and the internal data bus 288, respectively (or a single internal bus configured to transfer address and data). The core 200 may receive the data from the buffer 252 on the internal data pipeline 212 for the core 200, and may write the data to the array 210 by changing or updating data values stored by the cells of the array 210.

Although only one external clock signal 282 is depicted in FIG. 2, the device controller 126, in certain embodiments, may provide more than one external clock or strobe signals 282 for controlling the memory die 202. For example, in one embodiment, a read enable strobe (for reads) or a data strobe (for writes) may control the speed of data transfer via the data port 154. For example, if the data port 154 is eight bits wide, a 64 bit burst of data may be transferred in four clock cycles of the read enable strobe or the data strobe (e.g., eight transfers, using double data rate signaling). In a further embodiment, the device controller 126 may provide a further external clock signal at one fourth the frequency of the read enable and data strobes, so that one clock cycle of the further external clock signal corresponds to the time it takes to transfer the data for one storage operation between the device controller 126 and the buffer 252. (Similarly, if a data burst of another size, or on a bus of a different width, takes more or fewer than four clock cycles of a read enable or data strobe, an external clock signal that cycles once per data burst may be provided by dividing the read enable or data strobe frequencies appropriately).

Certain types of non-volatile memory die 202 may use a synchronous buffer 252 for data transfers, where data transfers between the core 200 and the buffer 252, and data transfers between the buffer 252 and the device controller 126 (also referred to herein as an "external" controller because it is external to the die 202) are controlled by the same clock signal (e.g., external clock signal 282). For example, the buffer 252 may be a synchronous FIFO buffer, with an input frequency that matches its output frequency. However, using a synchronous buffer may introduce latency in several ways. For example, the entire internal path for a storage operation, including the internal controller 250 initiating the storage operation, the core 200 performing the storage operation, and the data transfer between the core 200 and the buffer 252 for the storage operation, may be controlled according to the external clock signal 282, but may be capable of functioning at faster speeds or higher clock frequencies. The size of the buffer 252 or the number of stages may be increased to compensate for the increased latency of the internal data path, but increasing the number of stages may increase the on-chip area of the buffer 252. Additionally, because data for storage operations enters and exits a synchronous buffer at the same speed, additional latency may be associated with pre-filling the buffer stages before data is transferred out of the buffer 252 (e.g., pre-fetching read data), which may be increased further if the number of stages is also increased.

Instead, in a certain embodiment, internal operations of the die 202, including the internal controller 250 initiating the storage operation, the core 200 performing the storage operation, and the data transfer between the core 200 and the buffer 252 for the storage operation, may be controlled according to an internal clock signal for the memory die 202. An internal clock signal may be provided by a clock generator circuit included in the internal controller 250 or elsewhere on the die 202. Signals, buses, pathways, operations or components may be referred to as being in an "internal clock domain" if they are synchronized with or controlled according to the internal clock signal, and may correspondingly be referred to as being in an "external clock domain" if they are synchronized with or controlled according to an external clock signal 282.

In FIG. 2, black (filled) arrows depict information flow in the internal clock domain, and white (unfilled) arrows depict information flow in the external clock domain. Thus, in the depicted embodiment, operations that are controlled according to the internal clock signal (e.g., in the internal clock domain) include the internal controller 250 initiating the storage operation (e.g., using the data path control component 150 to send an address via an internal bus 286), the core 200 performing the storage operation, and the data transfer between the core 200 and the buffer 252 for the storage operation (e.g., as controlled by the internal bus driver 258 using the internal bus 288). Conversely, operations in the depicted embodiment that are controlled according to the external clock signal 282 (e.g., in the external clock domain) include data transfer between the buffer 252 and the external controller 126 via the data port 154, and the external controller 126 sending the command and address information via the command/address port 152.

In certain embodiments, using an internal clock signal to control internal operations may reduce the latency of the internal data path, compared to using an external clock signal 282 to control the internal operations. For example, for a read operation, sending the address to the core 200, moving data within the core 200 (e.g., within the internal data pipeline 212), and transferring the read data to the buffer 252 may add four clock cycles to the time it takes to actually read the data from the array 210. The die 202 may be capable of performing those operations in as little as 44 ns, but if the operations take place in an external clock domain with a clock period of 15 ns (for example), four clock cycles may add 60 ns of latency to the data path instead of only 44 ns. By contrast, if an internal clock with a period of 12.5 ns is used, the same four clock cycles may add only 50 ns of latency to the data path. Internal and external clock periods, numbers of clock cycles for performing operations, and the like are disclosed for illustrative and non-limiting purposes. In another embodiment, while still using an internal clock signal to reduce latency, clock and die speeds may be different.

In one embodiment, the internal clock signal is independent of the external clock signal 282. A clock signal may be referred to herein as "independent" of another clock signal if it is generated separately from, independently of, or without reference to the other clock signal. For example, an independent internal clock signal may be generated without reference to the external clock signal 282. As a further example, a clock speed, period, or frequency for an internal clock signal may be based on how fast the die 202 is capable of running internal operations, while an external clock signal 282 from the external controller 126 may be based on how fast the external controller 126 is capable of sending and receiving data. An internal clock signal that depends on the external clock signal 282 (e.g., by multiplying the frequency of the external clock signal 282) would be slowed if the die 202 is used with a slower external controller 126. By contrast, in certain embodiments, generating an internal clock signal independently of the external clock signal 282 may allow the internal clock signal to be configured at a speed suitable for the die 202, regardless of the speed of the external controller 126 or the external clock signal 282.

In some embodiments, a time for transferring data of a storage operation between the core 200 and the buffer 252 (e.g., via internal data bus 288) may correspond to one clock cycle of the internal clock for the die 202. Similarly, in further embodiments, a time for transferring data of one storage operation between the buffer 252 and the device controller 126 may correspond to one clock cycle for the external clock signal 282 (although, as described above, the external controller 126 may provide additional external clock signals 282 at other speeds). In certain embodiments, a clock cycle for the internal clock signal (e.g., a time for transferring data of a storage operation between the core 200 and the buffer 252) may be faster (e.g., may take place in less time) than a time for transferring data of a storage operation between the buffer 252 and the external controller 126. An internal clock signal that is faster than an external clock signal 282 may still be said to be independent of the external clock signal 282 if the internal clock signal is generated without reference to the external clock signal 282.

In some embodiments, providing a faster connection between the core 200 and the buffer 252 than between the buffer 252 and the external controller 126 may reduce a data path latency for a die 202. For example, for a series of read operations, the core 200 may put data into the buffer 252 faster than the external controller 126 takes the data out of the buffer 252, and the core 200 can fill the buffer 252 with data of successive read operations while avoiding a long, high-latency prefetch period.

In certain embodiments, the buffer 252 may be or include an asynchronous first-in-first-out (FIFO) buffer that is updated based on the internal clock signal and the external clock signal 282. As described above, a synchronous or asynchronous FIFO buffer 252 may store and transfer data for storage operations in the order in which the storage operations were requested. In further embodiments, an asynchronous FIFO buffer 252 may pass data between clock domains, so that data is written to the asynchronous FIFO buffer 252 in one clock domain, and read from the asynchronous FIFO buffer 252 in another clock domain. For example, in the depicted embodiment, for a read operation, data from the core 200 may be transferred to the asynchronous FIFO buffer 252 in the internal clock domain, and the data may be transferred from the asynchronous FIFO buffer 252 to the external controller 126 in the external clock domain. Conversely, for a write operation in the depicted embodiment, data from the external controller 126 may be transferred to the asynchronous FIFO buffer 252 in the external clock domain, and subsequently transferred from the asynchronous FIFO buffer 252 to the core 200 in the internal clock domain. In certain embodiments, an asynchronous FIFO buffer 252 may include a ring buffer, a range of volatile memory, a set of latches, or the like, configured to queue data; a set of memory locations, registers, or the like storing values of read and write pointers; and control hardware for controlling data transfers, updating the pointers, and the like.

In some embodiments, however, a buffer 252 that passes data between two different clock domains can overflow if data is written to the buffer 252 faster than it is read from the buffer 252. In one embodiment, the internal data pipeline 212 for the core 200 may be treated as an extension of the buffer 252, so that the total number of stages available for buffering data associated with storage operations is the number of stages in the buffer 252 plus the number of stages in the internal data pipeline 212. However, problems associated with a buffer overflow, such as data corruption, may still occur if the buffer 252 and the internal data pipeline 212 are both full. Thus, in certain embodiments, the internal controller 250 may use the data path control component 150 to delay initiating a storage operation in response to determining that the internal data pipeline 212 and the buffer 252 are both full.

As used herein, a stage of the internal data pipeline 212 or of the buffer 252 may be referred to as "empty" if the stage is available to store data for a storage operation, and as "full" if the stage includes data for a storage operation that has not been completed. A read operation may be referred to as "completed" once the data of the read operation has been transferred from the buffer 252 to the device controller 126. The buffer stage where the data of the read operation was stored is then empty, and may be used to buffer data for a subsequent storage operation. Conversely, a write operation may be referred to as "completed" once the data for the write operation has been recorded to the array 210 or non-volatile memory cells from the internal data pipeline 212. The internal data pipeline stage where the data of the write operation was stored is then empty, and may be used to buffer data for a subsequent write operation. In one embodiment, empty stages may be erased (e.g., zeros, ones, or another special data value indicating that the stage is empty may be stored). In another embodiment, empty stages may still store data of a completed operation, but the internal data pipeline 212 and/or the buffer 252 may safely overwrite the completed operation data when the stage is in use again.

The term "full" may also be used herein with reference to the internal data pipeline 212 and/or the buffer 252 themselves to indicate that the stages are full. Thus, the internal data pipeline 212 and the buffer 252 are both full if there no empty stages in either the internal data pipeline 212 or the buffer 252.

In some embodiments, read and write pointers of a buffer 252 may indicate whether the buffer 252 is full. For example, a write pointer may point to a buffer stage where data is to be written and may be incremented to point to the next stage in response to data being written to the stage where the write pointer is currently pointing. (A buffer 252 may be configured as a ring so that the "next" stage after the last stage is the first stage). Similarly, a read pointer may point to a buffer stage from which data is to be read, and may be incremented to point to the next stage in response to the data being read. Thus, the write pointer wrapping around the buffer 252 and catching up to the read pointer may indicate that the buffer 252 is full. However, read and write pointers for the buffer 252 alone may not indicate whether the buffer 252 and the internal data pipeline 212 are both full. Therefore, in certain embodiments, the internal controller 250 and/or the data path control component 150 may keep track of when storage operations are initiated and completed, to determine whether the internal data pipeline 212 and the buffer 252 are both full. In the depicted embodiment, the data path control component 150 includes a counter 254 and a synchronizer 256, and uses the counter 254 and the synchronizer 256, as described below, to determine whether the internal data pipeline 212 and the buffer 252 are both full, or whether the queue or buffer 252 and the internal data pipeline 212, combined, include an empty stage. In another embodiment, however, the counter 254 and/or the synchronizer 256 may be omitted, and the data path control component 150 may determine whether the internal data pipeline 212 and the buffer 252 are both full in another way.

In certain embodiments, the internal controller 250 may use the data path control component 150 to delay initiating a storage operation, in response to determining that the internal data pipeline 212 and the buffer 252 are both full. For example, the internal data pipeline 212 and the queue or buffer 252 may both be full with data from storage operations that have been started but not completed, and the data path control component 150 may wait to start a further storage operation in response to determining that the queue or buffer 252 and the internal data pipeline 212, combined, do not include an empty stage. In one embodiment, the data path control component 150 may dispatch addresses for executing the storage operations, but may halt dispatch of an address for a storage operation in response to determining that a difference between a number of addresses that have been dispatched and a number of storage operations that have been completed satisfies a threshold based on a total number of stages in the internal data pipeline 212 and the means for buffering data.

In one embodiment, initiating a read operation may include sending the address for the read operation to the core 200, and the data path control component 150 may stop sending or dispatching addresses to delay initiating a read operation, wait to start further read operations, or the like. Halting dispatch of read addresses may include queuing addresses to send to the core 200 at a later time, signaling to the device controller 126 that a read operation will not be initiated (so that the device controller 126 re-requests the read operation at a later time), or the like. If the queue or buffer 252 and the internal data pipeline 212 are both full of data from previous read operations (e.g., if the queue or buffer 252 and the internal data pipeline 212, combined, do not include an empty stage), then delaying initiation of a read operation may provide time for data of one of the previous read operations to be transferred from the buffer 252 to the device controller 126, creating an empty stage in the buffer 252. The empty stage in the buffer 252 may then be filled with data from the internal data pipeline 212, creating an empty stage in the internal data pipeline 212, which is then available for data of a further read operation.

In a further embodiment, initiating a write operation may include sending the address for the write operation to the core 200 along with the data to be written, from the buffer 252. The data path control component 150 may stop sending or dispatching addresses and data to delay initiating a write operation, wait to start further write operations, or the like. Halting dispatch of write addresses and data may include queuing addresses for data that will be sent by the device controller 126 at a later time, when an empty stage is available in the buffer 252, signaling to the device controller 126 that a write operation will not be initiated (so that the device controller 126 re-requests the write operation at a later time), or the like. If the queue or buffer 252 and the internal data pipeline 212 are both full of data from previous write operations (e.g., if the queue or buffer 252 and the internal data pipeline 212, combined, do not include an empty stage), then delaying initiation of a write operation may provide time for data of one of the previous write operations to be written from the internal data pipeline 212 to the array 210 of memory cells, creating an empty stage in the internal data pipeline 212. The buffer 252 may remain full until another write operation is initiated (including sending the address and transferring the data to be written from the buffer 252 to the empty stage in the internal data pipeline 212). Accordingly, in certain embodiments, the internal controller 250 may also communicate with the external controller 126 (e.g., via a ready/busy signal) to cause the external controller 126 to delay sending further data to be written until an empty buffer stage is available. In another embodiment, the external controller 126 may be configured to wait a gap time between sending data for subsequent write operations, where the gap time is selected to allow an empty buffer stage to become available.

In various embodiments, (as described above with regard to read and write operations), delaying initiation of a storage operation may provide time for one or more already-initiated storage operations to be completed, increasing the number of empty stages in the internal data pipeline 212 and/or the buffer 252. Thus, in a further embodiment, the internal controller 250 and/or the data path control component 150 may initiate a previously-delayed storage operation, resume dispatching addresses for storage operations, and/or start a further storage operation in response to determining that the internal data pipeline 212 and/or the buffer 252 includes an empty stage.

In a certain embodiment, the internal controller 250 and/or the data path control component 150 may halt or resume dispatching addresses based on determining whether the difference between a number of addresses that have been dispatched and a number of storage operations that have been completed satisfies a threshold. In a further embodiment, the threshold may be based on the total number of stages in the internal data pipeline 212 and the buffer 252. A threshold may be "satisfied" or "unsatisfied" based on comparing the difference between dispatched addresses and completed storage operations to a threshold value. For example, in one embodiment, the threshold may be satisfied if the difference exceeds (or exceeds or equals) the threshold value, and may be unsatisfied if the difference is less than or equal to (or strictly less than) the threshold value.

In general, in various embodiments, the difference between the number of addresses that have been dispatched and the number of storage operations that have been completed may correspond to a number of full stages in the internal data pipeline 212 and/or the buffer 252. Thus, a threshold may be satisfied if too many stages are full, and the internal controller 250 and/or the data path control component 150 may halt dispatching addresses accordingly. Conversely, the threshold may be unsatisfied if there are enough empty stages to resume dispatching addresses, and the internal controller 250 and/or the data path control component 150 may resume dispatching addresses accordingly. Thus, in various embodiments, the threshold may be based on the total number of stages in the internal data pipeline 212 and the buffer 252. For example, in one embodiment, the threshold may be satisfied if the difference between the number of addresses that have been dispatched and the number of storage operations that have been completed is equal to the total number of stages in the internal data pipeline 212 and the buffer 252 (e.g., if the internal data pipeline 212 and the buffer 252 are both full). In another embodiment, the internal controller 250 may reserve some number of stages for internal use, and the threshold may be satisfied if the difference between the number of addresses that have been dispatched and the number of storage operations that have been completed is equal to the total number of stages in the internal data pipeline 212 and the buffer 252, minus the number of stages reserved for internal use. Various further ways of selecting a threshold value based on the total number of stages in the internal data pipeline 212 and the buffer 252 will be clear in view of this disclosure.

In various embodiments, the internal controller 250 and/or the data path control component 150 may use a counter 254 to determine whether the queue or buffer 252 and the internal data pipeline 212, combined, comprise an empty stage, or whether the internal data pipeline 212 and the buffer 252 are both full. In various embodiments, a counter 254 may include a register, a set of flip-flops, a memory location, or the like, configured to store, increment, and decrement a number. Equivalently, a counter 254 may include two such locations configured to store and increment numbers, and logic circuits for calculating a difference between the two numbers, so that incrementing one of the numbers is equivalent to decrementing the counter 254. Various types of counters 254 will be clear in view of this disclosure.

In one embodiment, the counter 254 may track a difference between a number of storage operations that have been initiated by the internal controller 250 and a number of storage operations that have been completed, to determine whether the internal data pipeline 212 and the buffer 252 are both full. The counter 254 may determine the difference between the number of addresses that have been dispatched and the number of storage operations that have been completed, count storage operations that have been started and storage operations that have been completed (and compare both counts), or the like. For example, for a read operation, the counter 254 may be incremented in response to a signal for initiating the read operation (e.g., an internal clock signal for sending the address of data to be read to the core 200, resulting in an empty stage being filled), and may be decremented in response to a signal for completing the read operation (e.g., an external clock signal 282 for transferring read data from the buffer 252 to the device controller 126, resulting in an empty stage being created). Thus, the value of the counter 254 may correspond to the number of full stages in the internal data pipeline 212 and the buffer 252. In a further embodiment, the data path control component 150 may delay or resume initiating further storage operations based on comparing the value of the counter 254 to the total number of stages for the internal data pipeline 212 and the buffer 252. Equivalently, in another embodiment, an initial value for the counter 254 may be the total number of stages, and the counter 254 may be decremented as stages are filled, and compared to zero to determine whether to delay initiating further storage operations.

In one embodiment, the counter 254 may operate in the internal clock domain for the memory die 202. For example, in a certain embodiment, the counter 254 may be updated (e.g., incremented, decremented, or left unchanged) when edges of the internal clock signal occur. However, in a certain embodiment, completing a read operation may include transferring data between the buffer 252 and the device controller 126, in an external clock domain (e.g., based on an external clock signal 282). An external clock signal 282 for transferring data of a storage operation between the buffer 252 and the external controller 126 may be referred to as a data transfer signal 282. For example, a data transfer signal 282, in the external clock domain, may initiate or control data transfers between the between the buffer 252 and the external controller 126. Because the read operation is completed by the data transfer, updating the counter 254 when an operation is completed may depend on the data transfer signal 282, in the external clock domain. However, because edges of a signal in the external clock domain may be independent of the internal clock domain in which the counter 254 operates, the counter 254 may miss a pulse or cycle of the data transfer signal 282, and may not accurately reflect the number of full (or empty stages).

Thus, in a certain embodiment, the synchronizer 256 converts a data transfer signal 282 from an external clock domain, for transferring data of a storage operation between the buffer 252 and the external controller 126, to a counter update signal 284 in an internal clock domain, for updating the counter 254. For example, in the depicted embodiment, the synchronizer 256 receives the data transfer signal 282 from the internal bus driver 258 (which receives it from the external controller 126), converts the data transfer signal 282 to a counter update signal 284 in the internal clock domain, and sends the counter update signal 284 to the counter 254. In various embodiments, synchronizing the data transfer signal 282 to the internal clock domain may avoid the counter 254 missing a signal that occurs in the external clock domain. An embodiment of a synchronizer 256 is described in further detail below with regard to FIGS. 3, 4A, and 4B.

Figure 3:
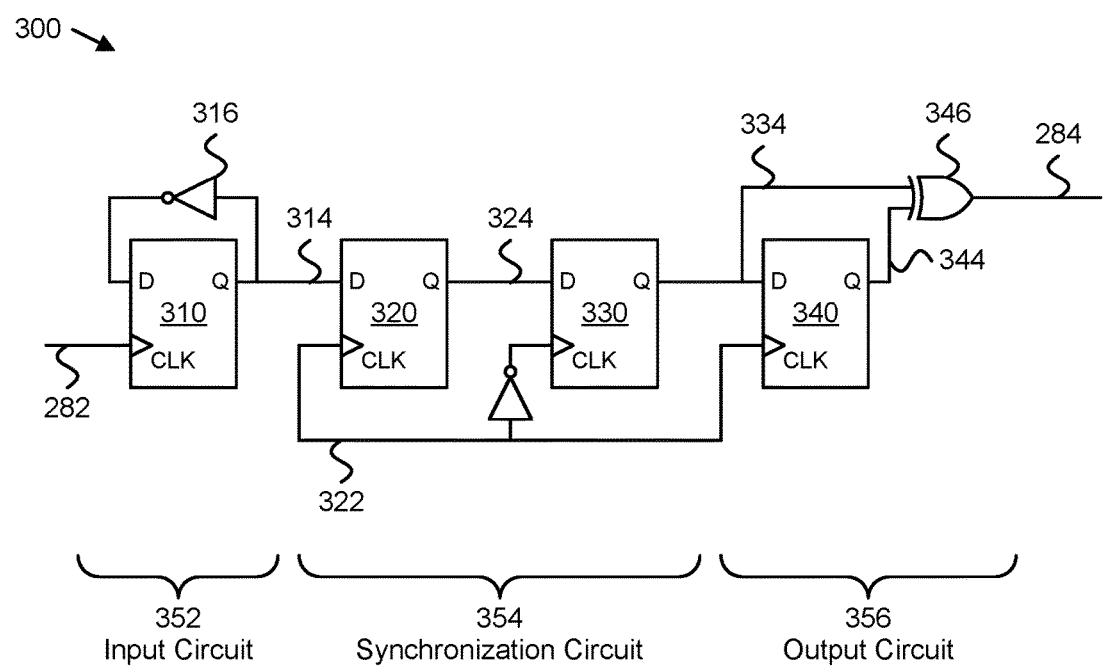
FIG. 3 is a circuit diagram illustrating one embodiment of a synchronizer.
Figure 4A:
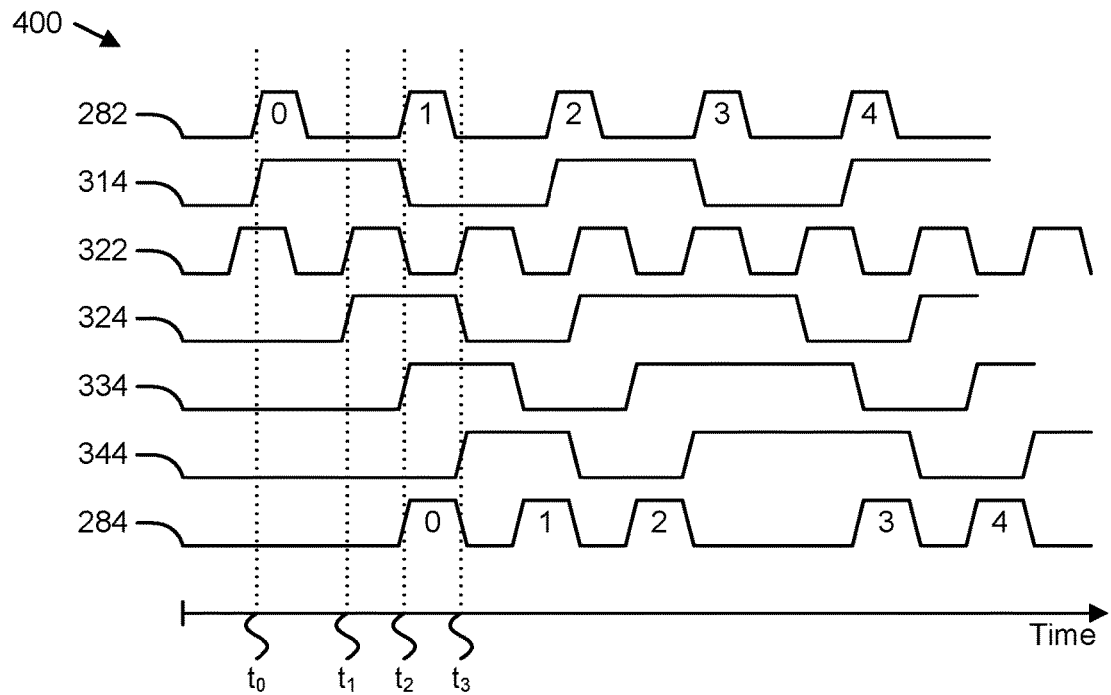
FIG. 4A is a timeline illustrating the operation of a synchronizer, in one embodiment.
Figure 4B:
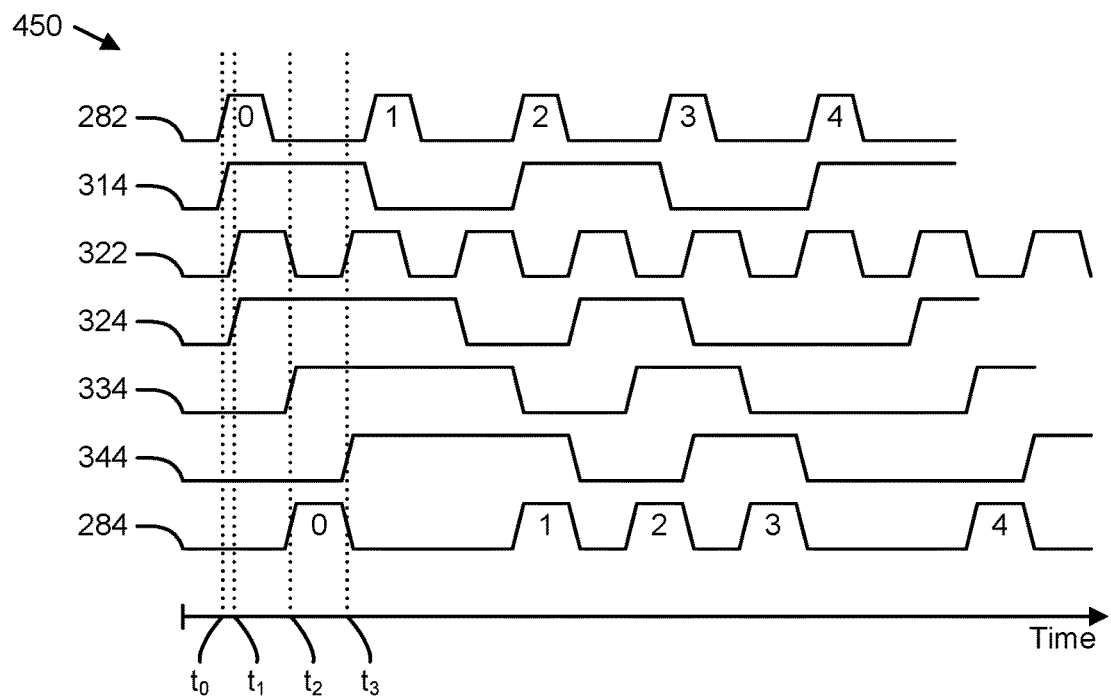
FIG. 4B is a timeline illustrating the operation of a synchronizer, in another embodiment.

FIG. 3 is a circuit diagram illustrating one embodiment of a synchronizer 300. The synchronizer 300 may be substantially similar to the synchronizer 256 described above with regard to FIG. 2, and may convert a data transfer signal 282 from an external clock domain to a counter update signal 284 in an internal clock domain. In the depicted embodiment, the synchronizer 300 includes an input circuit 352, a synchronization circuit 354, and an output circuit 356. FIGS. 4A and 4B depict timelines 400, 450 illustrating signals or voltages at different points for the synchronizer 300 of FIG. 3. The signals alternate between high and low values (e.g., voltages). In the depicted embodiment, a "pulse" of a signal refers to a period where the value for the signal is high, beginning with a rising or positive edge, and ending with a falling or negative edge. In another embodiment, using a different convention, a "pulse" for a signal may refer to a period where the value for the signal is low (beginning with a falling edge and ending with a rising edge).

In the depicted embodiment, data from multiple read operations is stored in the buffer 252, and five pulses of the data transfer signal 282 arrive from the device controller 126, to transfer the data from five read operations to the device controller 126. In the depicted embodiment, each pulse of the data transfer signal 282 completes a read operation, so the counter update signal 284 should similarly include five pulses to update the counter 254. In FIGS. 4A and 4B the pulses of the data transfer signal 282 and the counter update signal 284 are labeled 0-4.

In general, in various embodiments, a synchronizer 300 may synchronize a signal from an external clock domain to an internal clock domain by capturing values of the external clock domain signal at times controlled by the internal clock. In the depicted embodiment, the synchronizer 300 includes four D-type flip-flops 310, 320, 330, 340, that each receive a clock input ("CLK), capture the value of the data input ("D") when a rising edge of the clock input occurs, and produce the captured value at the output ("Q"). Thus, a D-type flip-flop effectively checks and outputs the value of its data input on every rising edge of a clock signal received by the clock input, and the output of each flip-flop 310, 320, 330, 340 is in the same clock domain as its clock input (except that the output may be metastable if an edge of the data input and a rising edge of the clock input overlap). In another embodiment, different types of flip-flops or other clocked circuits may be used by a synchronizer 300 to output signals in a particular clock domain.

In the depicted embodiment, an internal clock signal 322 is provided, which is faster than the data transfer signal 282 from the external clock domain. However, it may be seen in FIGS. 4A and 4B that while the period of the data transfer signal 282 is longer than the period of the internal clock signal 322, the pulses of the data transfer signal 282 are shorter than one period of the internal clock signal 322. Thus, checking the value of the data transfer signal 282 on every rising edge of the internal clock signal 322 could miss a pulse of the data transfer signal 282 that occurs entirely between rising edges of the internal clock signal 322.

Accordingly, in one embodiment, the input circuit 352 toggles an intermediate signal 314 in the external clock domain in response to a pulse of the data transfer signal 282. As used herein, "toggling" a signal may refer to changing or switching the signal one time, either from a high value to a low value, or from a low value to a high value. Thus, while a "pulse" includes a rising edge and a falling edge, a signal "toggles" at each edge. In certain embodiments, toggling an intermediate signal 314 in response to a pulse of the data transfer signal 282 may allow the pulse to be detected by sampling, capturing, or detecting the value of the toggled intermediate signal 314 (e.g., at a rising edge of the internal clock signal 322) even if the pulse has ended before the intermediate signal 314 is captured.

In the depicted embodiment, the input circuit 352 includes a flip-flop 310 that receives the data transfer signal 282 in the external clock domain as a clock input, and a NOT gate 316 that couples an inverted output of the input circuit flip-flop 310 to a data input of the input circuit flip-flop 310. Because the output of the flip-flop 310 is inverted and coupled to the data input, the output will toggle every time a rising edge of the clock input occurs. Thus, with the data transfer signal 282 coupled to the clock input, the intermediate signal 314 from the output will be toggled in the external clock domain in response to a pulse of the data transfer signal 282 (specifically, when a rising edge of the pulse occurs).

The synchronization circuit 354, in one embodiment, converts the intermediate signal 314 to the internal clock domain. In the depicted embodiment, the synchronization circuit 354 includes a first flip-flop 320 that receives the intermediate signal 314 from the external clock domain, and a second flip-flop 330 that receives an output signal 324 from the first flip-flop 320, and outputs the converted intermediate signal 334 (e.g., the intermediate signal 314 from the input circuit 352, converted to the internal clock domain).

In the depicted embodiment, the internal clock signal 322 is coupled to the clock input of the first flip-flop 320 for the synchronization circuit 354. Thus, a toggle of the intermediate signal 314 from the input circuit 352 will be captured and output on the next rising edge of the internal clock signal 322. However, because the intermediate signal 314 from the input circuit 352 is in the external clock domain, an edge when the intermediate signal 314 toggles may overlap with a rising edge for the internal clock signal 322, and the output signal 324 of the first flip-flop 320 in the synchronization circuit 354 may be metastable. Chaining the second flip-flop 330 to the first flip-flop 320 provides a delay, during which the possibly metastable output 324 of the first flip-flop 320 can resolve to a stable low or high value. In one embodiment, the clock input for the second flip-flop 330 is inverted relative to the clock input for the first flip-flop 320, so that the second flip-flop 330 captures the output signal 324 of the first flip-flop 320 after a half-cycle delay (e.g., on a falling edge of the internal clock signal 322), instead of after a full-cycle delay (e.g., on the next rising edge of the internal clock signal 322). In another embodiment, neither clock input may be inverted relative to the other clock input, to implement a full-cycle delay. In either case, the first flip-flop 320 and the second flip-flop 330 both may be referred to as operating in the internal clock domain because they are controlled (directly or in inverted form) by the internal clock signal 322.

The output circuit 356, in one embodiment, outputs a pulse for the counter update signal 284 in the internal clock domain, in response to the converted intermediate signal 334 from the synchronization circuit 354 toggling. In general, in various embodiments, the input circuit 352 converts pulses to toggles, the synchronization circuit 354 brings the toggles into the internal clock domain, and the output circuit 356 converts the toggle back to pulses.

In the depicted embodiment, the output circuit 356 includes a flip-flop 340 that delays the converted intermediate signal 334, and an XOR gate 346 that produces a pulse for the counter update signal 284 based on the converted intermediate signal 334 and the delayed converted intermediate signal 344. In the depicted embodiment, the clock input of the output flip-flop 340 is coupled to the internal clock signal 322, so that the output flip-flop 340 outputs a signal 344 on the rising edge of the internal clock signal 322, a half cycle after the second flip-flop 330 of the synchronization circuit 354 outputs the converted intermediate signal 334 (on the falling edge of the internal clock signal 322, because its clock input is inverted). In another embodiment, where the clock input for the second flip-flop 330 of the synchronization circuit 354 is not inverted, the delay from the first flip-flop 320 of the synchronization circuit 354 to the second flip-flop 330 to the output flip-flop 340 may be two full cycles of the internal clock signal 322 rather than two half cycles.

When the converted intermediate signal 334 and the delayed converted intermediate signal 344 are the same, the output of the XOR gate 346 is low. However, when the converted intermediate signal 334 toggles, the output of the XOR gate 346 goes high until the delayed converted intermediate signal 344 also toggles, a half cycle later. Thus, every toggle of the converted intermediate signal 334 begins a half-cycle pulse for the counter update signal 284.

FIGS. 4A and 4B depict timelines 400, 450 (respectively) illustrating the signals discussed above with regard to the synchronizer 300 of FIG. 3. Each timeline 400, 450 depicts the data transfer signal 282 (in the external clock domain), the toggled intermediate signal 314 produced by the input circuit 352, the internal clock signal 322, the output signal 324 from the first flip-flop 320 in the synchronization circuit 354, the converted intermediate signal 334 from the second flip-flop 330 in the synchronization circuit 354, the delayed converted intermediate signal 344 from the output flip-flop 340, and the counter update signal 284.

Both timelines 400, 450 depict five pulses, labeled 0-4, for the data transfer signal 282, in the external clock domain. Times $t_0$, $t_1$, $t_2$, and $t_3$ are labeled for events corresponding to pulse 0. Corresponding events are labeled similarly in both timelines 400, 450, although they may occur at different times. The input circuit 352 toggles the intermediate signal 314 in the external clock domain in response to pulses of the data transfer signal 282. In the depicted embodiment, the intermediate signal 314 toggles on each rising edge of pulses 0-4 in the data transfer signal 282. For example, the intermediate signal 314 toggles to a high value at the rising edge of pulse 0 (at time $t_0$), and toggles back to a low value at the rising edge of pulse 1. In the depicted embodiment, the intermediate signal 314 is still in the external clock domain, because it is not controlled by the internal clock signal 322.

Changes to the toggled intermediate signal 314, corresponding to pulses of the data transfer signal 282, are captured by the first flip-flop 320 of the synchronization circuit 354 at the next rising edge of the internal clock signal 322 producing the (possibly metastable) output signal 324, and changes to the output signal 324 are captured by the second flip-flop 330 of the synchronization circuit 354, at the next falling edge of the internal clock signal 322, producing the converted intermediate signal 334. For example, the toggle in the intermediate signal 314 produced at time $t_0$ by the rising edge of pulse 0 is captured at time $t_1$ (the next rising edge of the internal clock signal 322) by the first flip-flop 320 of the synchronization circuit 354, and the corresponding change in the output signal 324 from the first flip-flop 320 is captured at time $t_2$ (the next falling edge of the internal clock signal 322) by the second flip-flop 330 of the synchronization circuit 354. Thus, in the depicted embodiment, the converted intermediate signal 334 from the second flip-flop 330 of the synchronization circuit 354 is a toggled signal similar to the toggled intermediate signal 314 from the input circuit 352, but in the internal clock domain.

The output flip-flop 340, in the depicted embodiment, captures the converted intermediate signal 334 on the next rising edge of the internal clock signal 322. For example, the toggle in the converted intermediate signal 334 at time $t_2$, produced in response to the rising edge of pulse 0 in the data transfer signal 282, is captured by the output flip-flop 340 a half-cycle of the internal clock signal 322 later, at time $t_3$. Thus, in the depicted embodiment, the delayed converted intermediate signal 344 is the converted intermediate signal 334, delayed by a half-cycle of the internal clock signal 322.

Lastly, the XOR gate 346 combines the converted intermediate signal 334 and the delayed converted intermediate signal 344 to produce pulses for the counter update signal 284. Where the converted intermediate signal 334 and the delayed converted intermediate signal 344 are the same, the counter update signal 284 output by the XOR gate 346 is low. However, in the half-cycle before a change in the converted intermediate signal 334 is captured by the output flip-flop 340 to produce the delayed converted intermediate signal 344, the counter update signal 284 output by the XOR gate 346 is high. Thus, each toggle of the converted intermediate signal 334 produces a pulse in the counter update signal 284. It may be seen in timelines 400, 450, that pulses 0-4 for the data transfer signal 282, in the external clock domain, are thus converted to pulses 0-4 for the counter update signal 284, in the internal clock domain. For example, pulse 0 for the data transfer signal 282, beginning at time $t_0$, is converted to pulse 0 for the counter update signal 284, beginning at time $t_2$ and ending at time $t_3$.

In timeline 400, depicted in FIG. 4A, the rising edge of pulse 0 for the data transfer signal 282, at time $t_0$, occurs slightly after a rising edge of the internal clock signal 322. The corresponding toggle in the intermediate signal 314 is not captured by the first flip-flop 320 in the synchronization circuit 354 until the next rising edge of the internal clock signal 322, at time $t_1$, nearly a full cycle of the internal clock signal 322 later. The corresponding pulse 0 for the counter update signal 284 ends another cycle of the internal clock signal 322 later, at time $t_3$. Thus, in timeline 400, the synchronizer 300 may update the counter 254 with approximately two internal clock cycles of delay.

In timeline 450, depicted in FIG. 4B, the rising edge of pulse 0 for the data transfer signal 282, at time $t_0$, occurs slightly before a rising edge of the internal clock signal 322, so the corresponding toggle in the intermediate signal 314 is captured by the first flip-flop 320 in the synchronization circuit 354 almost immediately at time $t_1$. (Thus, times to and $t_1$ are much closer in timeline 450 than in timeline 400). The corresponding pulse 0 for the counter update signal 284 ends one cycle of the internal clock signal 322 later, at time $t_3$. Thus, in timeline 450, the synchronizer 300 may update the counter 254 with approximately one internal clock cycle of delay. In certain embodiments, the size of the buffer 252 may be selected to compensate for one to two internal clock cycles of delay introduced by the synchronizer 300.

Figure 5:
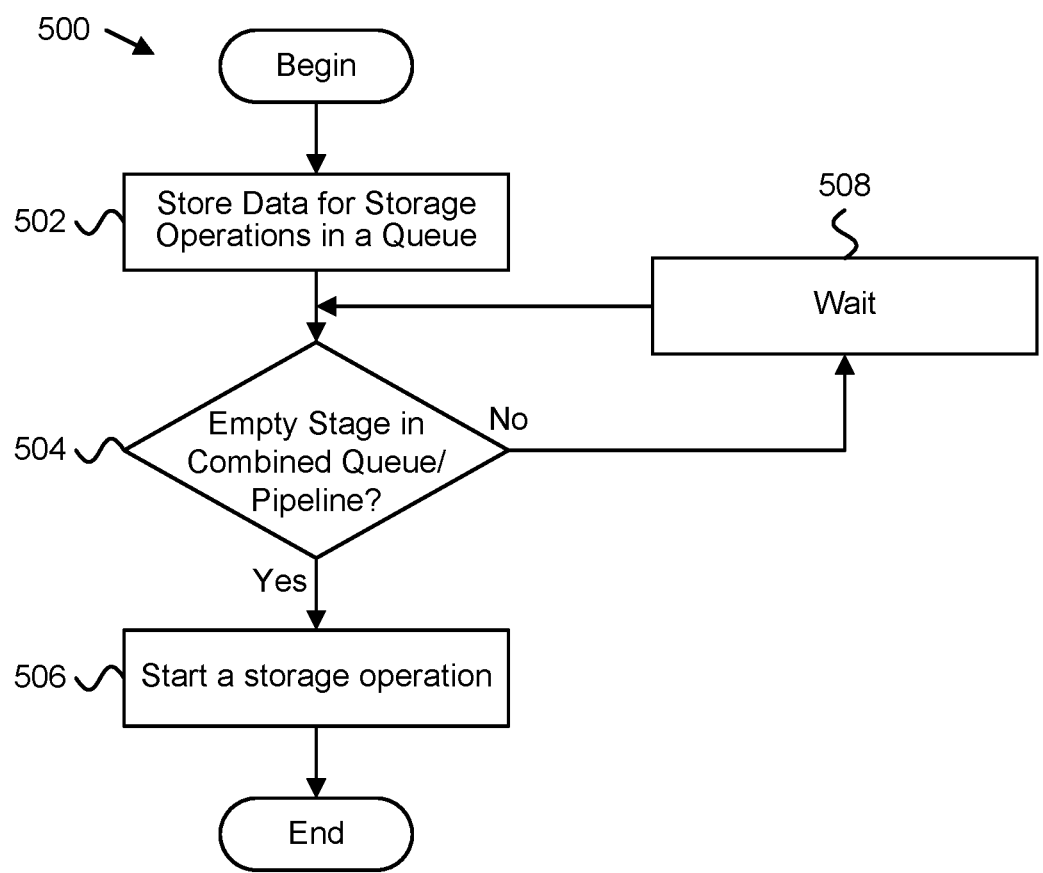
FIG. 5 is a schematic flow chart diagram illustrating one embodiment of a method for controlling a data path for non-volatile memory.

FIG. 5 is a schematic flow chart diagram illustrating one embodiment of a method 500 for controlling a data path for non-volatile memory. The method 500 begins, and the internal controller 250 stores 502 data for storage operations in a queue 252. The storage operations are for a memory core 200 including an array 210 of non-volatile storage cells and an internal data pipeline 212. The data path control component 150 determines 504 whether the queue 252 and the internal data pipeline 212, combined, include an empty stage. If the queue 252 and the internal data pipeline 212, combined, do not include an empty stage, the data path control component 150 waits 508 to start a storage operation, and the method 500 continues with the data path control component 150 redetermining 504 whether the queue 252 or the internal data pipeline 212, include an empty stage. If the queue 252 and the internal data pipeline 212, combined, do include an empty stage, the data path control component 150 starts 506 a storage operation, and the method 500 ends.

Figure 6:
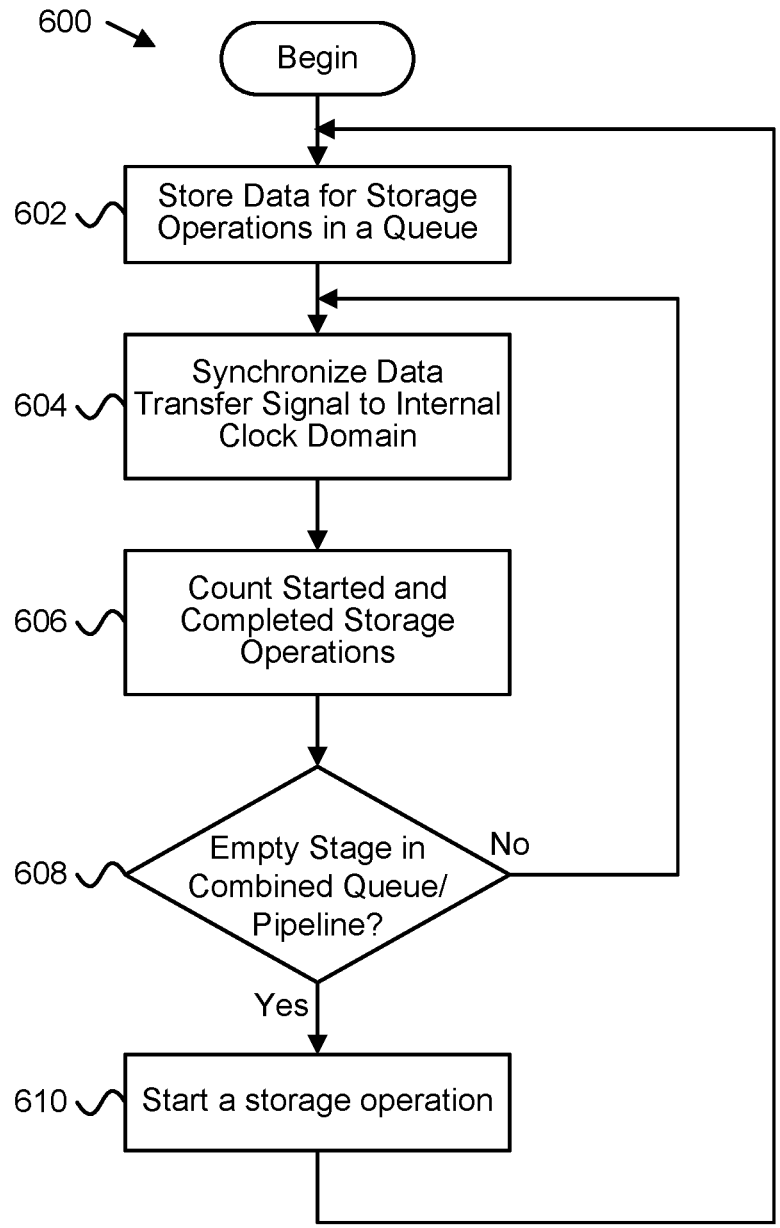
FIG. 6 is a schematic flow chart diagram illustrating another embodiment of a method for controlling a data path for non-volatile memory.

FIG. 6 is a schematic flow chart diagram illustrating another embodiment of a method 600 for controlling a data path for non-volatile memory. The method 600 begins, and the internal controller 250 stores 602 data for storage operations in a queue 252. The storage operations are for a memory core 200 including an array 210 of non-volatile storage cells and an internal data pipeline 212. A synchronizer 256 synchronizes 604 a data transfer signal 282 from an external clock domain, for transferring data of a storage operation between the queue 252 and an external controller 126, to an internal clock domain, for updating a counter 254. The counter 254 counts 606 storage operations that have been started and storage operations that have been completed. Based on the counts of started and completed storage operations, the data path control component 150 determines 608 whether the queue 252 and the internal data pipeline 212, combined, include an empty stage. If the queue 252 and the internal data pipeline 212, combined, do not include an empty stage, the method 600 continues with further synchronization 604 of data transfer signals 282, and counting 606 of started and completed storage operations. If the queue 252 and the internal data pipeline 212, combined, do include an empty stage, the data path control component 150 starts 610 a storage operation. The internal controller 250 continues to store 602 data for further storage operations in the queue 252, and the method 600 continues.

A means for buffering data associated with storage operations for a memory core 200, in various embodiments, may include a buffer 252, latches, registers, a range of volatile memory, a circular buffer, a FIFO circuit, an asynchronous FIFO circuit, other storage circuits or elements capable of buffering data, an internal controller 250, an internal bus driver 258, other logic hardware, and/or other executable code stored on a computer readable storage medium. Other embodiments may include similar or equivalent means for buffering data associated with storage operations.

A means for dispatching addresses for executing storage operations, in various embodiments, may include an internal controller 250, a data path control component 150, a counter 254, a synchronizer 256, an internal bus driver 258, an internal bus 286, 288, other logic hardware, and/or other executable code stored on a computer readable storage medium. Other embodiments may include similar or equivalent means for dispatching addresses.

A means for halting dispatch of an address, in various embodiments, may include an internal controller 250, a data path control component 150, a counter 254, a synchronizer 256, an internal bus driver 258, other logic hardware, and/or other executable code stored on a computer readable storage medium. Other embodiments may include similar or equivalent means for halting dispatch of addresses.

A means for resuming dispatch of an address, in various embodiments, may include an internal controller 250, a data path control component 150, a counter 254, a synchronizer 256, an internal bus driver 258, an internal bus 286, 288, other logic hardware, and/or other executable code stored on a computer readable storage medium. Other embodiments may include similar or equivalent means for resuming dispatch of addresses.

A means for determining the difference between the number of addresses that have been dispatched and the number of storage operations that have been completed, in various embodiments, may include an internal controller 250, a data path control component 150, a counter 254, a synchronizer 256, a buffer 252, an internal data pipeline 212, other logic hardware, and/or other executable code stored on a computer readable storage medium. Other embodiments may include similar or equivalent means for determining the difference.

A means for converting a data transfer signal 282 from an external clock domain to a counter update signal 284 in an internal clock domain, in various embodiments, may include, an internal controller 250, a data path control component 150, a synchronizer 256, an input circuit 352, a synchronization circuit 354, an output circuit 356, other logic hardware, and/or other executable code stored on a computer readable storage medium. Other embodiments may include similar or equivalent means for converting a signal from an external clock domain to signal in an internal clock domain.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
one or more memory die, a memory die comprising,
a memory core comprising an array of non-volatile memory cells and an internal data pipeline;
a buffer that stores data associated with storage operations for the memory core; and
an internal controller that communicates with the memory core to initiate the storage operations, wherein the internal controller delays initiating a storage operation in response to determining that the internal data pipeline and the buffer are both full.

2. The apparatus of claim 1, wherein the internal controller initiates the storage operation in response to determining that one or more of the internal data pipeline and the buffer comprises an empty stage.

3. The apparatus of claim 1, wherein:
the internal controller initiating the storage operation, the core performing the storage operation, and data transfer between the core and the buffer for the storage operation are controlled according to an internal clock signal for the memory die; and
data transfer between the buffer and an external controller is controlled according to an external clock signal.

4. The apparatus of claim 3, wherein the buffer comprises an asynchronous first-in-first-out (FIFO) buffer that is updated based on the internal clock signal and the external clock signal.

5. The apparatus of claim 3, wherein the internal clock signal is independent of the external clock signal.

6. The apparatus of claim 3, wherein a clock cycle for the internal clock signal is faster than a time for transferring data of a storage operation between the buffer and the external controller.

7. The apparatus of claim 1, further comprising a counter that tracks a difference between a number of storage operations that have been initiated by the internal controller and a number of storage operations that have been completed, to determine whether the internal data pipeline and the buffer are both full.

8. The apparatus of claim 7, further comprising a synchronizer that converts a data transfer signal from an external clock domain, for transferring data of a storage operation between the buffer and an external controller, to a counter update signal in an internal clock domain, for updating the counter.

9. The apparatus of claim 8, wherein the synchronizer comprises:
an input circuit that toggles an intermediate signal in the external clock domain in response to a pulse of the data transfer signal;
a synchronization circuit that converts the intermediate signal to the internal clock domain; and
an output circuit that outputs a pulse for the counter update signal in the internal clock domain, in response to the converted intermediate signal toggling.

10. The apparatus of claim 9, wherein the synchronization circuit comprises a first flip-flop that receives the intermediate signal from the external clock domain, and a second flip-flop that receives an output signal from the first flip-flop, the first and second flip-flops operating in the internal clock domain.

11. The apparatus of claim 10, wherein a clock input for the second flip-flop is inverted compared to a clock input for the first flip-flop.

12. The apparatus of claim 9, wherein:
the input circuit comprises a flip-flop that receives the data transfer signal in the external clock domain as a clock input, and a NOT gate that couples an inverted output of the input circuit flip-flop to a data input of the input-circuit flip-flop; and
the output circuit comprises a flip-flop that delays the converted intermediate signal and an XOR gate that produces the pulse for the counter update signal based on the converted intermediate signal and the delayed converted intermediate signal.

13. An apparatus comprising:
means for buffering data associated with storage operations for a memory core, the memory core comprising an array of non-volatile memory cells and an internal data pipeline;
means for dispatching addresses, wherein the means for dispatching addresses communicates with the memory core to initiate the storage operations; and
means for halting address dispatch, wherein the means for halting address dispatch delays initiation of a storage operation in response to determining that the internal data pipeline and the means for buffering data are both full.

14. The apparatus of claim 13, further comprising means for resuming address dispatch, wherein the means for resuming address dispatch initiates the storage operation in response to determining that one or more of the internal data pipeline and the means for buffering data comprises an empty stage.

15. The apparatus of claim 13, further comprising means for determining a difference, wherein the means for determining a difference tracks a difference between a number of storage operations that have been initiated by the means for dispatching addresses and a number of storage operations that have been completed, to determine whether the internal data pipeline and the means for buffering data are both full.

16. The apparatus of claim 15, further comprising means for converting, wherein the means for converting converts the data transfer signal from an external clock domain, for transferring data of a storage operation between the means for buffering and an external controller, to a counter update signal in an internal clock domain, for updating the means for determining the difference.

17. A method comprising:
using a buffer to store data associated with storage operations for a memory core, the memory core comprising an array of non-volatile memory cells and an internal data pipeline
communicating with the memory core to initiate the storage operations; and
delaying initiation of a storage operation in response to determining that the internal data pipeline and the buffer are both full.

18. The method of claim 17, further comprising initiating the storage operation in response to determining that one or more of the internal data pipeline and the buffer comprises an empty stage.

19. The method of claim 17, wherein determining whether the internal data pipeline and the buffer are both full comprises using a counter to track a difference between a number of storage operations that have been initiated and a number of storage operations that have been completed.

20. The method of claim 19, wherein tracking the difference comprises converting a data transfer signal from an external clock domain, for transferring data of a storage operation between the buffer and an external controller, to a counter update signal in an internal clock domain, for updating the counter.

\* \* \* \* \*